United States Patent
Aimura et al.

(10) Patent No.: US 7,176,263 B2
(45) Date of Patent: Feb. 13, 2007

(54) ACRYLIC RUBBER COMPOSITION AND CROSSLINKED PRODUCT

(75) Inventors: Yoshiaki Aimura, Tokyo (JP); Kiyonori Umetsu, Tokyo (JP); Hirofumi Masuda, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/515,823

(22) PCT Filed: May 27, 2003

(86) PCT No.: PCT/JP03/06568

§ 371 (c)(1),
(2), (4) Date: Nov. 26, 2004

(87) PCT Pub. No.: WO03/099924

PCT Pub. Date: Dec. 4, 2003

(65) Prior Publication Data

US 2005/0222341 A1 Oct. 6, 2005

(30) Foreign Application Priority Data

May 27, 2002 (JP) ............................. 2002-152152

(51) Int. Cl.
*C08F 8/32* (2006.01)
*C08C 19/22* (2006.01)
(52) U.S. Cl. .................. 525/381; 525/329.7; 525/379; 525/374
(58) Field of Classification Search ............ 525/329.7, 525/381, 379, 374
See application file for complete search history.

(56) References Cited

U.S. PATENT DOCUMENTS

| | | | |
|---|---|---|---|
| 5,047,473 | A | 9/1991 | Piejko et al. |
| 5,096,966 | A | 3/1992 | Piejko et al. |
| 5,104,935 | A | 4/1992 | Leitz et al. |
| 5,250,617 | A | 10/1993 | Piejko et al. |
| 2003/0027935 | A1* | 2/2003 | Kubota et al. ........... 525/329.7 |

FOREIGN PATENT DOCUMENTS

| | | |
|---|---|---|
| EP | 0 337 187 A2 | 10/1989 |
| JP | 2001-146540 * | 5/2001 |
| JP | 2001-146540 A | 5/2001 |
| JP | 2001-207008 A | 7/2001 |
| JP | 2001-265737 A | 9/2002 |
| JP | 2002-317091 A | 10/2002 |
| WO | WO-01/57132 A1 | 8/2001 |

* cited by examiner

*Primary Examiner*—Ling-Sui Choi
(74) *Attorney, Agent, or Firm*—Birch, Stewart, Kolasch & Birch, LLP

(57) ABSTRACT

An acrylic rubber composition comprising a carboxyl group-containing acrylic rubber (A) comprising 0.1 to 30% by weight of structural units derived from methacrylonitrile, and a polyamine crosslinking agent (B) and a monoamine compound (C); wherein the amount of each of the crosslinking agents (B) and the monoamine compound (C) is in the range of 0.05 to 20 parts by weight based on 100 parts by weight of the acrylic rubber (A). This acrylic rubber composition is free from sticking to a metal at kneading and exhibits good resistance to scorch during being processed, and gives a crosslinked product having good heat resistance, good cold resistance and good resistance to deteriorated oil.

16 Claims, No Drawings

ACRYLIC RUBBER COMPOSITION AND CROSSLINKED PRODUCT

This application is the National Phase of PCT/JP03/106568, filed May 27, 2003, and claims priority under 35 U.S.C. §119 of Japanese application no. 2002-152152, filed in Japan on May 27, 2002, the entire contents of which are hereby incorporated by reference.

TECHNICAL FIELD

This invention relates to an acrylic rubber composition and crosslinked product thereof.

This crosslinked product is suitable as a material for, for example, a seal and a hose, which have good heat resistance, good cold resistance and good resistance to deteriorated oil.

BACKGROUND ART

An acrylic rubber has good heat resistance, oil resistance and other properties, and therefore, is widely used as a material for rubber parts to be fitted in contact with metal or oil, such as seals, hoses, vibration insulators, tubes and belts in an automobile industry and related industries. For the acrylic rubber used for these rubber parts, a reduced permanent set, a reduced corrosive action for metal and a more enhanced oil resistance, as well as good heat resistance and good cold resistance, are required.

When an uncrosslinked acrylic rubber is kneaded by a Banbury mixer or a roll mill, the acrylic rubber tends to easily stick to the inner metal wall of the Banbury mixer or the surface of the roll. This leads to a decrease of recovery ratio, and further, cleaning of the Banbury mixer or the roll mill is required. It is, therefore, eagerly desired to reduce the stickiness of the acrylic rubber to a metal surface.

Further, when an acrylic rubber is processed, scorch is liable to occur, namely, a crosslinking reaction easily proceeds. Thus, prevention or minimization of scorch also is desired.

A crosslinked rubber product of a crosslinkable rubber composition comprising an acrylic rubber having copolymerized therein a mono-lower-alkyl ester of fumaric acid, an aromatic diamine crosslinking agent, and a guanidine compound crosslinking accelerator has been proposed as a crosslinked rubber product exhibiting a reduced corrosive action for metal and having good oil resistance in Japanese Unexamined Patent Publication No. H11-92614. This crosslinked rubber product further has good heat-aging resistance and cold resistance, but exhibits poor resistance to deteriorated oil and scorch stability, and tends to stick to a metal surface.

An acrylic rubber composition comprising a copolymer made from an alkoxy acrylate, 10–15% by weight of acrylonitrile and a required amount of a crosslinking monomer has been proposed in Japanese Unexamined Patent Publication No. 2001-146540, which can exhibit an enhanced impermeability to fuel, while good sour gasoline resistance and good amine resistance are kept when the rubber composition is used for a fuel hose for automobiles. However, this rubber composition has a problem such that the cold resistance and heat resistance are reduced.

To reduce the stickiness of an acrylic rubber to a metal surface, it is adopted to incorporate an internal release agent such as ester wax, paraffin wax, an organic acid metal salt and silicone oil in an acrylic rubber. However, when the acrylic rubber having incorporated therein an internal release agent is crosslinked, permanent set and other properties of a resulting crosslinked product are deteriorated.

DISCLOSURE OF THE INVENTION

An object of the present invention is to provide an acrylic rubber composition exhibiting a reduced stickiness to a metal surface and a reduced tendency of scorching when it is processed, and giving a crosslinked product having good heat resistance, good cold resistance and good resistance to deteriorated oil.

The present inventors made researches to solve the foregoing problems, and found that a composition comprising a carboxyl group-containing acrylic rubber having structural units derived from methacrylonitrile and having incorporated therein a specific crosslinking agent, and a specific amine compound exhibits a reduced stickiness to a metal surface and a reduced tendency of scorching when it is processed, and gives a crosslinked product having good heat resistance, good cold resistance and good resistance to deteriorated oil. Based on this finding, the present invention has been completed.

Thus, in accordance with the present invention, there is provided an acrylic rubber composition comprising a carboxyl group-containing acrylic rubber (A) comprising 0.1 to 30% by weight of structural units derived from methacrylonitrile, and a polyamine crosslinking agent (B) and a monoamine compound (C); wherein the amount of each of the polyamine crosslinking agent (B) and the monoamine compound (C) is in the range of 0.05 to 20 parts by weight based on 100 parts by weight of the acrylic rubber (A).

In accordance with the present invention, there is further provided a crosslinked product made by crosslinking the above-mentioned acrylic rubber composition.

BEST MODE FOR CARRYING OUT THE INVENTION

The acrylic rubber composition of the present invention is characterized as comprising a carboxyl group-containing acrylic rubber (A) comprising 0.1 to 30% by weight of structural units derived from methacrylonitrile, and a polyamine crosslinking agent (B) and a monoamine compound (C); wherein the amount of each of the polyamine crosslinking agent (B) and the monoamine compound (C) is in the range of 0.05 to 20 parts by weight based on 100 parts by weight of the acrylic rubber (A).

The carboxyl group-containing acrylic rubber (A) used in the present invention comprises, as main structural units, structural units derived from an acrylic acid ester monomer (a) and structural units derived from a carboxyl group-containing ethylenically unsaturated monomer (b); and further comprises structural units derived from methacrylonitrile.

The content of structural units of methacrylonirile in the carboxyl group-containing acrylic rubber (A) is in the range of 0.1 to 30% by weight, preferably 0.2 to 25% by weight, more preferably 0.5 to 20% by weight, and especially preferably 1 to 10% by weight. If the content of structural units of methacrylonirile in the carboxyl group-containing acrylic rubber (A) is smaller than 0.1% by weight, the acrylic rubber composition exhibits poor scorch stability when it is processed, and a crosslinked rubber product obtained from the rubber composition has poor resistance to deteriorated oil. In contrast, if the content of structural units of methacrylonirile is larger than 30% by weight, a crosslinked rubber product has poor heat resistance and cold resistance. In the case when the content of structural units of methacrylonirile in the carboxyl group-containing acrylic rubber (A) is in the above-mentioned range, the acrylic rubber composition (A) exhibits a reduced tendency of scorching when it is processed, and gives a crosslinked product having good heat resistance, good cold resistance and good resistance to deteriorated oil.

The content of carboxyl group in the carboxyl group-containing acrylic rubber (A) is preferably in the range of $5\times10^{-4}$ ephr to $4\times10^{-1}$ ephr, more preferably $2\times10^{-3}$ ephr to $2\times10^{-1}$ ephr, and especially preferably $4\times10^{-3}$ ephr to $1\times10^{-1}$ ephr. When the content of carboxyl group in the carboxyl group-containing acrylic rubber (A) is too small, the degree of crosslinking is undesirably low and a crosslinked rubber product is liable to have poor shape retention. In contrast, when the content of carboxyl group is too large, a crsosslinked rubber product tends to be too hard to have a desired rubber elasticity.

It is preferable that the above-mentioned carboxyl group-containing acrylic rubber (A) comprises acrylic acid ester units (a'), carboxyl group-containing ethylenically unsaturated monomer units (b'), methacrylonitrile units, and units (c') of optional monomer copolymerizable with monomers of (a'), (b') and methacrylonitrile, wherein the amounts of these units are such that, based on the weight of the acrylic rubber (A), the sum [(a') plus (b')] of acrylic acid ester units (a') and carboxyl group-containing ethylenically unsaturated monomer units (b') is in the range of 70 to 99.9% by weight, the amount of methacrylonitrile units is in the range of 0.1 to 30% by weight, and the amount of the optional copolymerizable monomer units (c') is in the range of 0 to 70% by weight; and the ratio [(a')/{(a')+(b')}] of acrylic acid ester units (a') to the sum {(a')+(b')} of acrylic acid ester units (a') plus carboxyl group-containing ethylenically unsaturated monomer units (b') is in the range of 90 to 99.9% by weight.

The above-mentioned carboxyl group-containing acrylic rubber (A) can be prepared by copolymerizing an acrylic acid ester monomer (a), a carboxyl group-containing ethylenically unsaturated monomer (b), methacrylonitrile, and an optional monomer (c) copolymerizable with these monomers (a), (b) and methacrylonitrile by the convetional procedure adopted for the preparation of acrylic rubbers, for example, by an emulsion copolymerization procedure using a redox catalyst.

As the acrylic acid ester monomer (a), an alkyl acrylate monomer alone or a combination of an alkyl acrylate monomer with an alkoxyalkyl acrylate monomer is preferably used. The combination of an alkyl acrylate monomer with an alkoxyalkyl acrylate monomer is especially preferable.

The acrylic acid ester units (a') in the carboxyl group-containing acrylic rubber (A) preferably comprises 30 to 100% by weight, more preferably 30 to 90% by weight, especially preferably 40 to 89% by weight, and most preferably 45 to 88% by weight of alkyl acrylate monomer units and 0 to 70% by weight, more preferably 10 to 70% by weight, especially preferably 11 to 60% by weight, and most preferably 12 to 55% by weight of alkoxyalkyl acrylate monomer units. If the relative amount of alkyl acrylate monomer units is too large, a crosslinked rubber product is liable to have poor cold resistance or oil resistance. In contrast, if the relative amount of the alkoxyalkyl acrylate monomer units is too large, a crosslinked rubber product is liable to have poor tensile strength and elongation.

The alkyl acrylate monomer preferably includes those which have 1 to 8 carbon atoms in the alkyl group, and, as specific examples thereof, there can be mentioned methyl acrylate, ethyl acrylate, n-propyl acrylate, n-butyl acrylate, isopropyl acrylate, isobutyl acrylate, n-hexyl acrylate, 2-ethylhexyl acrylate and cyclohexyl acrylate. Of these, ethyl acrylate and n-butyl acrylate are especially preferable.

The alkoxyalkyl acrylate monomer preferably includes those which have 2 to 8 carbon atoms in the alkoxyalkyl group, and, as specific examples thereof, there can be mentioned methoxymethyl acrylate, ethoxymethyl acrylate, 2-ethoxyethyl acrylate, 2-butoxyethyl acrylate, 2-methoxyethyl acrylate, 2-propoxyethyl acrylate, 3-methoxypropyl acrylate and 4-methoxybutyl acrylate. Of these, 2-ethoxyethyl acrylate and 2-methoxyethyl acrylate are especially preferable.

As specific examples of the carboxyl group-containing ethylenically unsaturated monomer (b), there can be mentioned carboxylic acid monomers such as acrylic acid, methacrylic acid, ethacrylic acid, itaconic acid, maleic acid, fumaric acid and citraconic acid; and butenedioic acid monoalkyl ester monomers such as monomethyl maleate, monoethyl maleate, mono-n-butyl maleate, monomethyl fumarate, monoethyl fumarate and mono-n-butyl fumarate. The carboxyl group may be an acid anhydride group, and thus, the carboxyl group-containing ethylenically unsaturated monomer (b) further includes, for example, carboxylic acid anhydride monomers such as maleic anhydride and citraconic anhydride. Of these, monoethyl maleate, mono-n-butyl maleate, monoethyl fumarate and mono-n-butyl fumarate are preferable.

The ratio of structural units derived from acrylic acid ester monomer (a) to the sum of the acrylic acid ester structural units plus structural units derived from carboxyl group-containing ethylenically unsaturated monomer (b) is preferably in the range of 90 to 99.9% by weight, more preferably 92 to 99.7% by weight and especially preferably 94 to 99.5% by weight. The amount of units of carboxyl group-containing ethylenically unsaturated monomer (b) is preferably in the range of 0.1 to 10% by weight, more preferably 0.3 to 8% by weight and especially preferably 0.5 to 6% by weight. If the ratio of the units of acrylic acid ester monomer (a) to the sum of the main structural units of monomers (a) and (b) is too small, a crosslinked rubber product has poor tensile strength and elongation. In contrast, the ratio of the units of (a) to the sum of the units of (a) and (b) is too large, the degree of crosslinking is liable to be low.

The carboxyl group-containing acrylic rubber (A) used in the present invention may comprise, in addition to the main structural units (a') and (b') and methacrylonitrile units, units derived from a monomer copolymerizable with the monomers (a) and (b) and methacrylonitrile. Such optional copolymerizable monomers include, for example, conjugated diene monomers, non-conjugated diene monomers, aromatic vinyl monomers, α,β-ethylenically unsaturated nitrile monomers (except for methacrylonitrile), amide group-containing acrylic or methacrylic monomers, polyfunctional diacrylic or dimethacrylic monomers and other ethylenically unsaturated monomers. As specific examples of these copolymerizable monomers, there can be mentioned conjugated diene monomers such as 1,3-butadiene, 2-methyl-1,3-butadiene, chloroprene and piperylene; non-conjugated diene monomers such as 1,2-butadiene, 1,4-pentadiene, dicyclopentadiene, norbornene, ethylidene norbornene, 1,4-hexadiene and norbornadiene; aromatic vinyl monomers such as styrene, α-methylstyrene and divinylbenzene; α,β-ethylenically unsaturated nitrile monomers such as acrylonitrile; amide group-containing acrylic or methacrylic monomers such as acrylamide and methacrylamide; polyfunctional diacrylic or dimethacrylic monomers such as ethylene glycol diacrylate, propylene glycol diacrylate, ethylene glycol dimethacrylate and propylene glycol dimethacrylate; and other ethylenically unsaturated monomers such as ethylene, propylene, vinyl chloride, vinylidene chloride, vinyl acetate, ethyl vinyl ether and butyl vinyl ether.

The amount of units of the above-mentioned copolymerizable monomer in the carboxyl group-containing acryl rubber (A) is not particularly limited provided that the object of the present invention can be achieved, and the amount is preferably in the range of 0 to 20% by weight, more preferably 0 to 10% by weight.

The carboxyl group-containing acrylic rubber (A) preferably has a Mooney viscosity ($ML_{1+4}$, 100° C.) in the range of 10 to 70, more preferably 20 to 60 and especially preferably 30 to 50. If the Mooney viscosity of the acrylic rubber (A) is too small, an acrylic rubber composition is liable to have poor processability and a crosslinked rubber product is liable to have poor mechanical strength. In contrast, if the Mooney viscosity is too large, an acrylic rubber composition is also liable to have poor processability and poor shapability.

The polyamine crosslinking agent (B) in the acrylic rubber composition of the present invention is an amine compound capable of relatively easily reacting with carboxyl groups of the above-mentioned carboxyl group-containing acryl rubber (A) to form a crosslinked structure. The amine compound does not include those which have a non-conjugated carbon-carbon double bond, such as guanidine compounds. The polyamine crosslinking agent (B) includes aliphatic polyamine crosslinking agents and aromatic polyamine crosslinking agents.

As specific examples of the aliphatic polyamine crosslinking agent, there can be mentioned hexamethylene-diamine, hexamethylenediamine cabamate and N,N'-dicinnamylidene-1,6-hexamethylenediamine. As specific examples of the aromatic polyamine crosslinking agent, there can be mentioned 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylene-diamine, p-xylylenediamine, 1,3,5-benzenetriamine and 1,3,5-benzenetriaminomethyl.

The amount of the polyamine crosslinking agent is in the range of 0.05 to 20 parts by weight, preferably 0.1 to 10 parts by weight, more preferably 0.2 to 7 parts by weight and especially preferably 0.3 to 5 parts by weight, based on 100 parts by weight of the carboxyl group-containing acryl rubber (A). If the amount of the polyamine crosslinking agent is too small, the degree of crosslinking is small so that the crosslinked rubber product is difficult to have a desired shape retention. In contrast, if the polyamine crosslinking agent is too large, a crosslinked rubber product is too hard to have good rubber elasticity.

The acrylic rubber composition of the present invention may further comprise a crosslinking accelerator in combination with the polyamine crosslinking agent. The crosslinking accelerator used in combination with the polyamine crosslinking agent preferably has a base dissociation constant in the range of $10^{-12}$ to $10^6$ as measured in water at 25° C. The polyamine crosslinking agent having such base dissociation constant includes, for example, guanidine compounds, imidazole compounds, quaternary onium salts, tertiary phosphine compounds and alkali salts of a weak acid. As specific examples of the polyamine crosslinking agent, there can be mentioned guanidine compounds such as 1,3-diphenylguanidine and 1,3-diorthotolylguanidine; imidazole compounds such as 2-methylimidazole and 2-phenylimidazole; quaternary onium salts such as tetra-n-butylammonium bromide and octadecyl-tri-n-butylammonium bromide; polyvalent tertiary amine compounds such as triethylenediamine and 1,8-diaza-bicyclo-(5.4.0)undecene-7; tertiary phosphine compounds such as triphenylphosphine and tri-p-tolylphosphine; and alkali salts of a weak acid which include alkali salts of a weak inorganic acid such as sodium salts and potassium salts of phosphoric acid and carbonic acid, and alkali salts of a weak organic acid such as sodium salts and potassium salts of stearic acid and lauric acid.

The amount of the crosslinking accelerator used is preferably in the range of 0.1 to 20 parts by weight, more preferably 0.2 to 15 parts by weight and especially preferably 0.3 to 10 parts by weight, based on 100 parts by weight of the carboxyl group-containing acryl rubber (A). If the amount of crosslinking accelerator is too large, it is possible that the rate of crosslinking at crosslinking is too rapid, the crosslinking accelerator blooms to the surface of a crosslinked rubber product, and a crosslinked rubber product becomes too hard. In contrast, if the amount of crosslinking accelerator is too small, a crosslinked rubber product is liable to have very low tensile strength and exhibit a large change of elongation and a large change of tensile strength after heat load is imposed.

The monoamine compound (C) used in the present invention includes aromatic primary monoamine compounds, aromatic secondary monoamine compounds, aromatic tertiary monoamine compounds, aliphatic primary monoamine compounds, aliphatic secondary monoamine compounds and aliphatic tertiary monoamine compounds. These monoamine compounds may be used either alone or as a combination of at least two kinds thereof in the present invention. In the case when the monoamine compound is used alone, a primary monoamine compound (C-1) is preferably used, and, in the case when the monoamine compound is used in combination, a combination of an aliphatic secondary monoamine compound (C-2) with an aliphatic tertiary monoamine compound (C-3) is. preferably used.

The primary monoamine compound (C-1) used in the present invention is a compound obtained notionally by substituting one of the hydrogen atoms of ammonia by a hydrocarbon group, and includes aliphatic primary monoamines, alicyclic primary monoamines, aromatic primary monoamine, amino-alcohols and amino-oxo compounds. Of these, aliphatic primary monoamines are preferable. Aliphatic primary monoamines having 8 to 20 carbon atoms are especially preferable.

As specific examples of the aliphatic primary monoamine, there can be mentioned methylamine, ethylamine, propylamine, isopropylamine, n-butylamine, t-butylamine, sec-butylamine, hexylamine, heptylamine, octylamine, nonylamine, decylamine, undecylamine, dodecylamine, tridecylamine, tetradecylamine, pentadecylamine, cetylamine, 2-ethylhexylamine, octadecylamine, allylamine, cis-2-butenylamine, 10-uhdecenylamine, trans-2-octadecenylamine, cis-9-octadecenylamine and nonadecylamine. Of these, aliphatic primary monoamines having 8 to 20 carbon atoms such as octylamine, decylamine, dodecylamine, tetradecylamine, cetylamine, octadecylamine, nonadecylamine and cis-9-octadecenylamine are preferable. As specific examples of the alicyclic primary monoamine, there can be mentioned cyclopropylamine, cyclobutylamine and cyclopentylamine and cyclohexylamine. As specific examples of the aromatic primary monoamine, there can be mentioned aniline, o-toluidine, m-toluidine, benzylamine, α-naphthylamine and β-naphthylamine. As specific examples of the aminoalcohol, there can be mentioned aminoethanol, aminopropanol, D,L-alaninol, 2-aminobutyl alcohol, 2-amino-2-methylpropanol, 2-amino-2-hydroxymethyl-1,3-propanediol, 2-amino-2-methylpropane-1,3-diol, 2-amino-2-ethyl-1,3-propanediol, 1-chloro-3-aminopropane-2-ol, 3-amino-1,2-propanediol and 2-amino-1,3-propanediol. As specific examples of the amino-oxo compound, there can be mentioned 3-methoxypropylamine and 3-ethoxypropylamine.

The aliphatic secondary monoamine compound (C-2) used in the present invention is a compound obtained notionally by substituting two of the hydrogen atoms of ammonia by aliphatic hydrocarbon groups, and includes those in which each of the two aliphatic hydrocarbon groups have preferably 1 to 30 carbon atoms, more preferably 8 to 20 carbon atoms. As specific examples of the aliphatic secondary monoamine compound, there can be mentioned dimethylamine, diethylamine, dipropylamine, diallylamine, diisopropylamine, di-n-butylamine, di-t-butylamine, di-sec-butylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, di-cis-9-octadecenylamine and dinonadecylamine. Of these, dioctylamine, didecylamine, didodecylamine, ditetradecylamine, dicetylamine, dioctadecylamine, di-cis-9-octadecenylamine and dinonadecylamine are preferable. As specific examples of the alicyclic secondary monoamine compound, there can be mentioned dicyclohexylamine.

The aliphatic tertiary monoamine compound (C-3) used in the present invention is a compound obtained notionally by substituting the three hydrogen atoms of ammonia by aliphatic hydrocarbon groups, and includes those in which each of the three aliphatic hydrocarbon groups have preferably 1 to 30 carbon atoms, more preferably 1 to 22 carbon atoms. As specific examples of the aliphatic tertiary monoamine compound, there can be mentioned trimethylamine, triethylamine, tripropylamine, triallylamine, triisopropylamine, tri-n-butylamine, tri-t-butylamine, tri-sec-butylamine, trihexylamine, triheptylamine, trioctylamine, trinonylamine, tridecylamine, triundecylamine, tridodecylamine, tritridecylamine, tritetradecylamine, tripentadecylamine, tricetylamine, tri-2-ethylhexylamine, trioctadecylamine, tri-cis-9-octadecenylamine, trinonadecylamine, N,N-dimethyldecyl-amine, N,N-dimethyldodecylamine, N,N-dimethyltetradecylamine, N,N-dimethylcetylamine, N,N-dimethyloctadecylamine, N,N-dimethylbehenylamine, N-methyldidecylamine, N-methyldidodecylamine, N-methylditetradecylamine, N-methyldicetylamine, N-methyldioctadecylamine, N-dimethyldibehenylamine and dimethylcyclohexylamine. Of these, N,N-dimethyldodecylamine, N,N-dimethyltetradecylamine, N,N-dimethylcetylamine, N,N-dimethyloctadecylamine and N,N-dimethylbehenylamine are preferable.

The above-mentioned monoamine compound (C) may be used either alone or as a combination of at least two kinds thereof in the present invention. In either case, the total amount of monoamine compound (C) is in the range of 0.05 to 20 parts by weight, preferably 0.1 to 10 parts by weight, based on 100 parts by weight of the carboxyl group-containing acryl rubber (A). Especially when a primary monoamine is used alone, its amount is preferably in the range of 0.1 to 10 parts by weight, more preferably 0.2 to 5 parts by weight, and, when a combination of an aliphatic secondary monoamine with an aliphatic tertiary monoamine is used, the total amount thereof is preferably in the range of 0.2 to 10 parts by weight, more preferably 0.5 to 7 parts by weight. If the amount of the monoamine compound is too small, an acrylic rubber composition exhibits large stickiness to metal and has poor processability. In contrast, if the amount of the monoamine compound is too large, the monoamine compound is liable to bloom to the surface of a crosslinked rubber product, and the crosslinked rubber product tends to have very poor tensile strength and large permanent set.

The ratio ($c_m/b_m$) of the mole number ($c_m$) of monoamine compound (C) to the mole number ($b_m$) of polyamine crosslinking agent (B) is preferably in the range of 0.1 to 10, more preferably 0.1 to 9 and especially preferably 0.2 to 8. If the ratio ($c_m/b_m$) is too small, an acrylic rubber composition has poor scorch stability and poor processability. In contrast, if the ratio ($c_m/b_m$) is too large, the crosslink density is reduced, and hence, heat resistance is reduced and permanent set increases. When the ratio ($c_m/b_m$) is in the above-range, an acrylic rubber composition has good scorch stability, and a crosslinked rubber product has good characteristics such as high heat resistance and low permanent set.

The acrylic rubber composition of the present invention may comprise additives according to the need, which include, for example, a reinforcing agent, a filler, an antioxidant, a light stabilizer, a plasticizer, a processing aid, a lubricant, a self-adhesive, a fire retardant, a mildewproofing agent, an antistaic agent and a colorant.

The acrylic rubber composition may comprise rubbers, other than the acrylic rubber (A), elastomers, and resins, according to the need. More specifically, the acrylic rubber composition may comprise, for example, rubbers such as natural rubber, acrylic rubbers other than the acrylic rubber (A), polybutadiene rubber, polyisoprene rubber, styrene-butadiene rubber and acrylonitrile-butadiene rubber; elastomers such as olefinic elastomers, styrenic elastomers, vinyl chloride elastomer, polyester elastomers, polyamide elastomers, polyurethane elastomers and polysiloxane elastomers; and resins such as polyolefin resins, polystyrene resins, polyacrylate and methacrylate resins, polyphenylene-ether resin, polyester resins and polycarbonate resins.

The acrylic rubber composition of the present invention can be prepared by an appropriate mixing procedure such as roll mixing, Banbury mixing, screw mixing and solution mixing. The order in which the ingredients are mixed is not particularly limited. However, it is preferable that ingredients incapable of being easily reacted or decomposed when heated are first mixed thoroughly, and thereafter, ingredients capable of being easily reacted or decomposed when heated, such as a crosslinking agent, are mixed together in a short time upon at a temperature at which the crosslinking agent is neither reacted not decomposed.

The method of shaping the acrylic rubber composition of the present invention is not particularly limited. Any conventional shaping method including compression molding, injection molding, transfer molding and extrusion shaping can be adopted. The method of crosslinking can be appropriately chosen depending upon the particular shape or other factors of a crosslinked rubber product. The crosslinking may be carried out either simultaneously with the shaping or after the shaping.

The crosslinked product of the present invention can be obtained by crosslinking the acrylic rubber composition of the present invention having incorporated therein a crosslinking agent, by heating. The heating temperature is preferably in the range of 130 to 220° C., more preferably 140 to 200° C. The crosslinking time is preferably in the range of 30 seconds to 5 hours. The procedure for heating can appropriately be chosen from those which are conventionally used for crosslinking rubber compositions, such as press heating, steam heating, oven heating and hot-air heating. To crosslink the inside of the shaped rubber composition to a desired extent, a post curing, i.e., post crosslinking, may be additionally carried out after crosslinking is carried out once. The post curing time varies depending upon the heating procedure, the crosslinking temperature and the shape of crosslinked product, but is carried out preferably for 1 to 48 hours. The heating procedure and the heating temperature may be appropriately chosen.

EXAMPLES

The invention will now be specifically described by the following examples and comparative examples, that by no means limit the scope of the invention. In these examples and comparative examples, parts and % are by weight unless otherwise specified.

Properties of rubber, rubber composition and crosslinked rubber product were evaluated by the following methods.

(1) Mooney Viscosity

Mooney viscosity of an acrylic rubber was measured at a temperature of 100° C. according to JIS K6300.

(2) Stickiness to Metal Surface

An uncrosslinked specimen having a size of 1 cm×3 cm×0.8 cm composed of a crosslinkable rubber composition is placed in close contact with a surface of chromium-plated SUS metal plate, and the thus-superposed specimen and the SUS metal plate are pressed at 70° C. under a pressure of 3 MPa for 5 minutes. Stickiness was expressed in terms of a stress required for separating the specimen from the SUS metal plate. With a decrease of the stickiness value, the stickiness of the specimen to a surface of the SUS metal plate becomes smaller.

(3) Scorch Stability

Mooney scorch time (t5) was measured at a temperature of 125° C. according to JIS K6300. The larger the Mooney scorch time (t5), the better the scorch stability.

(4) Resistance to Deteriorated Oil

A rubber composition was pressed at a temperature of 170° C. for 20 minutes to be thereby crosslinked and shaped into a crosslinked sheet. The sheet was cut into a size of 15 cm×15 cm×2 mm, and left to stand at a temperature of 170° C. for 4 hours for post curing. The post-cured sheet was punched in to a desired shape to give a specimen.

Resistance to deteriorated oil was measured using an apparatus as stipulated in JIS K6258. Commercially available SJ-grade engine oil was used as a testing oil. To accelerate deterioration of oil, air was continuously introduced at a rate of 150 cc/min into a testing vessel. While air was introduced in this manner, the specimen was immersed in the testing oil at a temperature of 150° C. for 70 hours. The specimen was taken from the testing oil, and the surface hardness thereof was measured according to JIS K6251. The smaller the change in hardness as measured before and after the immersion, the better the resistance to deteriorated oil.

(5) Dry Physical Properties

A specimen was prepared by the same procedure as described above in (4). Strength at break (tensile strength) and elongation at break (elongation) were measured by the tensile testing method as stipulated in JIS K6251, and hardness was measured by the hardness testing method as stipulated in JIS K6253.

(6) Heat Resistance

A specimen was prepared by the same procedures as described above in (4). Elongation at break (elongation) and hardness as dry physical properties were measured by the same procedures as described above in (5). Then the specimen was left to stand at a temperature of 175° C. for 70 hours to conduct a hot-air heat aging test. Thereafter elongation and hardness were again measured to determine a change in elongation and a change in hardness. The smaller the changes in elongation and hardness, the better the heat resistance.

(7) Cold Resistance

A specimen was prepared by the same procedures as described above in (4). A low-temperature torsional test was conducted according to JIS K6261 to measure a Gehman T10 value (which is a temperature at which the specific modulus of rubber reached 10).

(8) Permanent Set

An O-ring specimen was compressed by 25%, and left to stand at a temperature of 175° C. for 70 hours. Then the specimen was released from the compression. The specimen was left to stand at a temperature of 23° C. and a humidity of 50% for 30 minutes, and then, a permanent set thereof was measured.

(9) Corrosion of Metal

A specimen was prepared by the same procedures as described above in (4). Plates of two kinds of metals, i.e., copper and brass, were prepared. The specimen was allowed to closely stick to each metal plate, and left to stand at a temperature of 40° C. and a humidity of 80% for one week. The corroded area was measured, and the corrosion of metal was evaluated by the ratio of the corroded area to the entire surface area. The corrosion of metal was expressed by the following two ratings. When the corroded area ratio was at least 10%, the corrosion of metal was expressed as "corroded". When the corroded area ratio was smaller than 10%, the corrosion of metal was expressed as "not corroded".

Example 1

An acrylic rubber A having the composition shown in Table 1 was prepared. The acrylic rubber A contained 43% of ethyl acrylate units, 30% of n-butyl acrylate units, 20% of 2-methoxyethyl acrylate units, 5% of methacrylonitrile units and 2% of mono-n-butyl maleate (monomer (a) units: 95%, monomer (b) units: 5%, the ratio of the alkyl acrylate monomer units to the monomer (a) units: 85.3%), and contained a carboxyl group in an amount of $9 \times 10^{-3}$ ephr and had a Mooney viscosity ($ML_{1+4}$, 100° C.) of 35. 100 parts by weight of the acrylic rubber A, 60 parts of carbon black (classified as N550 according to ASTM D1765), 2 parts of stearic acid (dispersant for carbon black, and softener), and 2 parts of 4,4'-bis(α,α-dimethylbenzyl)-diphenylamine (antioxidant) were kneaded together at 50° C. by a Banbury mixer. To the thus-obtained mixture, 0.5 part of 4,4'-diaminodiphenyl ether (aromatic primary diamine compound, crosslinking agent), 2 parts of di-o-tolylguanidine and 0.3 part of octadecylamine (aliphatic primary monoamine compound) were added, and the mixture was kneaded together at 40° C. by an open roll to obtain a crosslinkabe acrylic rubber composition.

Mooney scorch time and stickiness to a metal surface of the crosslinkable acrylic rubber composition were evaluated. The crosslinkable acrylic rubber composition was pressed, crosslinked and post cured by the above-mentioned procedures to prepare a crosslinked specimen. Using the crosslinked specimen, the tensile strength, elongation, hardness, heat resistance, cold resisatnce, resistance to deteriorated oil and corrosion of metal were evaluated. The crosslinked specimen was pressed at a temperature of 170° C. under a pressure of 10 MPa for 20 minutes, and further, left to stand at a temperature of 170° C. for 4 hours for post curing. An O-ring having a diameter of 3.1 mm was prepared from the post cured crosslinked product, and the permanent set thereof was evaluated. The results are shown in Table 2.

Example 2

The procedures described in Example 1 were repeated to make an acrylic rubber composition wherein 2 parts of didodcylamine (aliphatic secondary monoamine compound) and 2 parts of N,N-dimethyloctadecylamine (aliphatic tertiary monoamine) were used instead of 0.3 part of octadecylamine with all other conditions remaining the same. Characteristics of the acrylic rubber composition were evaluated in the same manners as described in Example 1. The results are shown in Table 2.

Comparative Example 1

The procedures described in Example 1 were repeated to make an acrylic rubber composition wherein octadecylamine was not used with all other conditions remaining the same. Characteristics of the acrylic rubber composition were evaluated in the same manners as described in Example 1. The results are shown in Table 2.

Comparative Example 2

The procedures described in Example 1 were repeated to make an acrylic rubber composition wherein an acrylic rubber B not containing structural units derived from methacrylonitrile was used instead of the acrylic rubber A having a methacrylonitrile group with all other conditions remaining the same. The acrylic rubber B contained 48% of ethyl acrylate units, 30% of n-butyl acrylate units, 20% of 2-methoxyethyl acrylate units and 2% of mono-n-butyl maleate, and contained a carboxyl group in an amount of $9 \times 10^{-3}$ ephr and had a Mooney viscosity ($ML_{1+4}$, 100° C.) of 35. The composition of the acrylic rubber B is shown in Table 1. Characteristics of the acrylic rubber composition were evaluated in the same manners as described in Example 1. The results are shown in Table 2.

Comparative Example 3

The procedures described in Example 1 were repeated to make an acrylic rubber composition wherein an acrylic rubber C containing acrylonitrile units was used instead of acrylic rubber A containing methacrylonitrile units with all other conditions remaining the same. The acrylic rubber C contained 43% of ethyl acrylate units, 30% of n-butyl acrylate units, 20% of 2-methoxyethyl acrylate units, 5% of acrylonitrile units and 2% of mono-n-butyl maleate units, and contained a carboxyl group in an amount of $9 \times 10^{-3}$ ephr and had a Mooney viscosity ($ML_{1+4}$, 100° C.) of 35. The composition of the acrylic rubber C is shown in Table 1. Characteristics of the acrylic rubber composition were evaluated in the same manners as described in Example 1. The results are shown in Table 2.

Comparative Example 4

The procedures described in Example 1 were repeated to make an acrylic rubber composition wherein 0.5 part of 2,4,6-trimercapto-s-triazine (crosslinking agent) and 1.5 parts of zinc dibutyldithiocarbamate (crosslinking accelerator) were used instead of 4,4'-diaminodiphenyl ether (polyamine crosslinking agent) and di-o-tolylguanidine (crosslinkingaccelerator), an acrylic rubber D was used-instead of acrylic rubber A, and a monoamine compound was not used with all other conditions remaining the same. The acrylic rubber D contained 42.5% of ethyl acrylate units, 30% of n-butyl acrylate units, 20% of 2-methoxyethyl acrylate units, 5% of methacrylonitrile units and 2.5% of vinyl chloroacetate units, and had a Mooney viscosity ($ML_{1+4}$, 100° C.) of 35. The composition of the acrylic rubber D is shown in Table 1. Characteristics of the acrylic rubber composition were evaluated in the same manners as described in Example 1. The results are shown in Table 2.

Comparative Example 5

The procedures described in Example 1 were repeated to make an acrylic rubber composition wherein 0.5 part of 2,4,6-trimercapto-s-triazine (crosslinking agent) and 1.5 parts of zinc dibutyldithiocarbamate (crosslinking accelerator) were used instead of 4,4'-diaminodiphenyl ether (polyamine crosslinking agent) and di-o-tolylguanidine (crosslinking accelerator) with all other conditions remaining the same. The crosslinking of the acrylic rubber composition did not proceed to any appreciable extent, and thus, characteristics thereof could not be evaluated.

TABLE 1

| Composition of Acrylic Rubbers | | | | |
|---|---|---|---|---|
| Kind of acrylic rubber | A | B | C | D |
| Ethyl acrylate | 43 | 48 | 43 | 42.5 |
| n-Butyl acrylate | 30 | 30 | 30 | 30 |
| 2-Methoxyethyl acrylate | 20 | 20 | 20 | 20 |
| Acrylonitrile | — | — | 5 | — |
| Methacrylonitrile | 5 | — | — | 5 |
| Mono-n-butyl fumarate | 2 | 2 | 2 | — |
| Vinyl chloroacetate | — | — | — | 2.5 |

TABLE 2

| | Example No. *1 | | | | | |
|---|---|---|---|---|---|---|
| | Ex. 1 | Ex. 2 | C. E. 1 | C. E. 2 | C. E. 3 | C. E. 4 |
| Formulation of rubber composition *2 | | | | | | |
| Acrylic rubber A | 100 | 100 | 100 | — | — | — |
| Acrylic rubber B | — | — | — | 100 | — | — |
| Acrylic rubber C | — | — | — | — | 100 | — |

TABLE 2-continued

| | Ex. 1 | Ex. 2 | C. E. 1 | C. E. 2 | C. E. 3 | C. E. 4 |
|---|---|---|---|---|---|---|
| Acrylic rubber D | — | — | — | — | — | 100 |
| Octadecylamine | 0.3 | — | — | 0.3 | 0.3 | — |
| Didodecylamine | — | 2 | — | — | — | — |
| N,N-Dimethyloctadecylamine | — | 2 | — | — | — | — |
| 4,4'-Diaminodiphenyl ether | 0.5 | 0.5 | 0.5 | 0.5 | 0.5 | — |
| Di-o-tolylguanidine | 2 | 2 | 2 | 2 | 2 | — |
| 2,4,6-Trimercapto-s-triazine | — | — | — | — | — | 0.5 |
| Zinc dibutyldithiocarbamate | — | — | — | — | — | 1.5 |
| Stickiness to metal surface | | | | | | |
| Sticking stress (kgf) | 0.8 | 0.6 | 2.9 | 0.7 | 0.7 | 2.0 |
| Mooney scorch time | | | | | | |
| t5 (min) | 12.4 | 13.2 | 8.9 | 8.2 | 8.3 | 9.1 |
| Property change after immersion in deteriorated oil | | | | | | |
| Change in hardness (point) | 2 | 2 | 2 | 4 | 6 | 8 |
| Property change after hot-air aging | | | | | | |
| Change in elongation (%) | 6 | 3 | −5 | −5 | −15 | 12 |
| Change in hardness (point) | 2 | 2 | 2 | 2 | 6 | 3 |
| Low-temperature tortional test | | | | | | |
| Gehman T10 (° C.) | −19.2 | −19.3 | −19.2 | −22.1 | −17.8 | −20.9 |
| Dry properties | | | | | | |
| Tensile strength (MPa) | 12.3 | 12.1 | 11.8 | 11.2 | 12.4 | 11.4 |
| Elongation (%) | 250 | 270 | 230 | 210 | 230 | 170 |
| Hardness (JIS-A) | 65 | 65 | 65 | 63 | 65 | 68 |
| Permanent set | | | | | | |
| Permanent set (%) | 53 | 51 | 52 | 52 | 53 | 80 |
| Corrosion of metal *3 | | | | | | |
| Corrosion of copper and brass | Not | Not | Not | Not | Not | C. |

*1 Ex.: Example, C. Ex.: Comparative Example
*2 Ingredients commonly contained in all of the rubber compositions in the working examples are not recited in Table 2
*3 Not: Not corroded, C: Corroded As seen from Table 2, an acrylic rubber composition not containing a monoamine compound has poor scorch stability and poor processability, and exhibits large stickiness to metal (Comparative Example 1). An acrylic rubber composition containing an acrylic rubber not containing methacrylonitrile units has poor scorch stability, and gives a crosslinked product exhibiting a large hardness change after immersion in deteriorated oil (Comparative Example 2). An acrylic rubber composition containing an acrylic rubber containing acrylonitrile units instead of methacrylonitrile units has poor scorch stability, and gives a crosslinked product having reduced heat-aging resistance and poor resistance to deteriorated oil (Comparative Example 3). In the case of an acrylic rubber composition containing a crosslinking agent other than a polyamine crosslinking agent, even if an acrylic rubber having a composition suitable for the used crosslinking agent is adopted, the acrylic rubber composition exhibits large stickiness to metal, and gives a crosslinked product exhibiting a large permanent set and causing corrosion of metal (Comparative Example 4). An acrylic rubber composition containing a combination of a crosslinking agent with a crosslinking accelerator, other than the combination of a polyamine crosslinking agent with a guanidine compound, cannot be crosslinked to any appreciable extent, and thus, it does not give a crosslinked product capable of being used in practice (Comparative Example 5).

In contrast, the crosslinkable acrylic rubber composition of the present invention exhibits a reduced stickiness to a metal surface and a reduced tendency of scorching when it is processed, and gives a crosslinked product having good resistance to deteriorated oil and causing no corrosion of metal (Examples 1 and 2).

INDUSTRIAL APPLICABILITY

An acrylic rubber composition of the present invention exhibits a reduced stickiness to a metal surface when it is kneaded, and a reduced tendency of scorching when it is processed, and gives a crosslinked rubber product having good heat resistance, good cold resistance and good resistance to deteriorated oil. Therefore, the crosslinked rubber product obtained by crosslinking the acrylic rubber composition of the present invention can be widely used as material for rubber parts such as seals, hoses, vibration insulators, tubes, belts and boots.

The invention claimed is:

1. An acrylic rubber composition comprising a carboxyl group-containing acrylic rubber (A) comprising 0.1 to 30% by weight of structural units derived from methacrylonitrile, a polyamine crosslinking agent (B) and at least one monoamine compound (C), the at least one monoamine compound (C) being a combination of an aliphatic secondary monoamine compound with an aliphatic tertiary monoamine compound, or a primary monoamine compound; wherein an amount of each of the crosslinking agents (B) and the monoamine compound (C) is in a range of 0.05 to 20 parts by weight based on 100 parts by weight of the acrylic rubber (A).

2. The acrylic rubber composition according to claim 1, wherein the acrylic rubber (A) comprises acrylic acid ester units (a'), carboxyl group-containing ethylenically unsaturated monomer units (b'), methacrylonitrile units, and units (c') of optional monomer copolymerizable with monomers of (a'), (b') and methacrylonitrile, wherein the amounts of these units are such that, based on the weight of the acrylic rubber (A), the sum [(a') plus (b')] of acrylic acid ester units (a') and carboxyl group-containing ethylenically unsaturated monomer units (b') is in the range of 70 to 99.9% by weight, the amount of methacrylonitrile units is in the range of 0.1 to 30% by weight, and the amount of the optional copolymerizable monomer units (c') is in the range of 0 to 70% by weight; and the ratio [(a')/{(a')+(b')}] of acrylic acid ester units (a') to the sum {(a')+(b')} of acrylic acid ester units (a') plus carboxyl group-containing ethylenically unsaturated monomer units (b') is in the range of 90 to 99.9% by weight.

3. The acrylic rubber composition according to claim 2, wherein the acrylic acid ester units (a') comprises 30 to 100% by weight of alkyl acrylate monomer units and 0 to 70% by weight of alkoxyalkyl acrylate monomer units.

4. The acrylic rubber composition according to claim 3, wherein the alkyl acrylate monomer is an alkyl acrylate monomer having an alkyl group with 1 to 8 carbon atoms in the ester group, and the alkoxyalkyl acrylate monomer is a monomer having an alkoxyalkyl group with 2 to 8 carbon atoms in the ester group.

5. The acrylic rubber composition according to claim 2, wherein the carboxyl group-containing ethylenically unsaturated monomer units (b') are structural units derived from a monomer selected from carboxylic acid monomers, butenedioic acid monoalkyl ester monomers and carboxylic acid anhydride monomers.

6. The acrylic rubber composition according to claim 1, wherein the content of methacrylonitrile units is in the range of 0.2 to 25% by weight.

7. The acrylic rubber composition according to claim 1, wherein the carboxyl group-containing acrylic rubber (A) contains a carboxyl group in an amount in the range of $5 \times 10^{-4}$ ephr to $4 \times 10^{-1}$ ephr.

8. The acrylic rubber composition according to claim 1, wherein the carboxyl group-containing acrylic rubber (A) has a Mooney viscosity ($ML_{1+4}$, 100° C.) in the range of 10 to 20.

9. The acrylic rubber composition according to claim 1, wherein the amount of the polyamine crosslinking agent (B) is in the range of 0.1 to 10 parts by weight based on 100 parts by weight of the carboxyl group-containing acrylic rubber (A).

10. The acrylic rubber composition according to claim 1, which further comprises a crosslinking accelerator having a base dissociation constant in the range of $10^{-12}$ to $10^6$ as measured in water at 25° C., in an amount of 0.1 to 20 parts by weight based on 100 parts by weight of the carboxyl group-containing acrylic rubber (A).

11. The acrylic rubber composition according to claim 1, wherein the ratio ($c_m/b_m$) of the mole number ($c_m$) of monoamine compound (C) to the mole number ($b_m$) of polyamine crosslinking agent (B) is in the range of 0.1 to 10.

12. The acrylic rubber composition according to claim 1, wherein the amount of the monoamine compound (C) is in the range of 0.1 to 10 parts by weight based on 100 parts by weight of the carboxyl group-containing acrylic rubber (A).

13. The acrylic rubber composition according to claim 1, wherein the sum of the amounts of aliphatic secondary monoamine compound and aliphatic tertiary monoamine compound is in the range of 0.2 to 10 parts by weight based on 100 parts by weight of the carboxyl group-containing acrylic rubber (A), and the amount of primary monoamine compound is in the range of 0.1 to 10 parts by weight based on 100 parts by weight of the carboxyl group-containing acrylic rubber (A).

14. A crosslinked product made by crosslinking the acrylic rubber composition as claimed in claim 1.

15. The crosslinked product according to claim 14, which is a sealing material, a hose material, a vibration insulator, a tube material, a belt material or a boot material.

16. The acrylic rubber composition according to claim 1, wherein a content of methacrylonitrile units is in a range of 0.1 to less than 10% by weight.

* * * * *